(12) United States Patent
Sawdon et al.

(10) Patent No.: US 8,122,959 B2
(45) Date of Patent: Feb. 28, 2012

(54) METHODS AND MATERIALS FOR ZONAL ISOLATION

(75) Inventors: Christopher Alan Sawdon, Par (GB); Hemant Kuman Jethalal Ladva, Missouri City, TX (US); Timothy Gareth John Jones, Cottenham (GB); Gary John Tustin, Sawston (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 486 days.

(21) Appl. No.: 11/993,353

(22) PCT Filed: Jun. 26, 2006

(86) PCT No.: PCT/GB2006/002351
§ 371 (c)(1),
(2), (4) Date: Aug. 28, 2009

(87) PCT Pub. No.: WO2007/003885
PCT Pub. Date: Jan. 11, 2007

(65) Prior Publication Data
US 2010/0065273 A1      Mar. 18, 2010

(30) Foreign Application Priority Data
Jun. 30, 2005 (GB) .................................. 0513388.9

(51) Int. Cl.
*E21B 21/00* (2006.01)
*E21B 33/138* (2006.01)
*E21B 33/14* (2006.01)
*E21B 33/16* (2006.01)

(52) U.S. Cl. ........ 166/288; 166/291; 166/293; 166/294; 166/295; 166/300; 175/64; 175/65

(58) Field of Classification Search .................. None
See application file for complete search history.

(56) References Cited

U.S. PATENT DOCUMENTS

| | | | | |
|---|---|---|---|---|
| 2,828,820 A | * | 4/1958 | Harvey et al. ................. | 166/293 |
| 3,014,530 A | * | 12/1961 | Harvey et al. ................. | 166/293 |
| 3,016,092 A | * | 1/1962 | Harvey et al. ................. | 166/293 |
| 3,168,139 A | * | 2/1965 | Kennedy et al. .............. | 166/292 |
| 3,240,736 A | | 3/1966 | Beckwith | |
| 3,437,619 A | | 4/1969 | Nutt | |
| 3,447,608 A | * | 6/1969 | Fry et al. ....................... | 166/293 |
| 3,750,768 A | | 8/1973 | Suman, Jr. et al. | |
| 4,115,336 A | | 9/1978 | Crouzet | |
| 4,204,988 A | | 5/1980 | Crouzet | |
| 4,547,298 A | | 10/1985 | Novak | |
| 4,613,649 A | | 9/1986 | Saeki et al. | |

(Continued)

FOREIGN PATENT DOCUMENTS

EP    0802253 A1    10/1997
(Continued)

*Primary Examiner* — George Suchfield

(57) ABSTRACT

The invention relates to the use of one or more water-soluble reactive liquid component capable of subsequent polymerization or cross-linking to form a solid to improve the zonal isolation and alleviate the impacts of cracks and fissures in the cement sheath around a completed subterranean well. It includes the steps of injecting a wellbore fluid carrying the reactive component or additive into the wellbore, injecting a cementitious composition as slurry into the wellbore and letting said reactive liquid component pass through at least one of the interfaces between cement and formation, cement and filter cake, and filter cake and formation before forming a solid of said reactive liquid component that traverses said at least one of the interfaces.

20 Claims, 3 Drawing Sheets

U.S. PATENT DOCUMENTS

| | | |
|---|---|---|
| 4,721,757 A | 1/1988 | Schindler |
| 4,722,976 A | 2/1988 | Ceska |
| 4,760,882 A | 8/1988 | Novak |
| 4,768,593 A | 9/1988 | Novak |
| 4,828,724 A | 5/1989 | Davidson |
| 4,874,675 A | 10/1989 | Ceska |
| 5,159,980 A | 11/1992 | Onan et al. |
| 5,181,568 A * | 1/1993 | McKown et al. ............. 166/293 |
| 5,288,807 A | 2/1994 | Hinz |
| 5,293,938 A | 3/1994 | Onan et al. |
| 5,355,954 A | 10/1994 | Onan et al. |
| 5,382,290 A | 1/1995 | Nahm et al. |
| 5,458,195 A * | 10/1995 | Totten et al. ................ 166/293 |
| 5,688,844 A | 11/1997 | Chatterji et al. |
| 5,712,314 A | 1/1998 | Surles et al. |
| 5,747,597 A | 5/1998 | Fujita et al. |
| 5,795,924 A | 8/1998 | Chatterji et al. |
| 5,874,387 A * | 2/1999 | Carpenter et al. ............ 507/228 |
| 5,945,387 A | 8/1999 | Chatterji et al. |
| 5,955,557 A | 9/1999 | Machida et al. |
| 6,098,711 A | 8/2000 | Chatterji et al. |
| 6,169,154 B1 | 1/2001 | Machida et al. |
| 6,234,251 B1 | 5/2001 | Chatterji et al. |
| 6,303,683 B1 | 10/2001 | Figovsky |
| 6,330,917 B2 | 12/2001 | Chatterji et al. |
| 6,433,075 B1 | 8/2002 | Davies et al. |
| 7,143,828 B2 * | 12/2006 | Reddy et al. .................. 166/294 |
| 2006/0122071 A1 * | 6/2006 | Reddy et al. .................. 507/219 |

FOREIGN PATENT DOCUMENTS

| | | |
|---|---|---|
| EP | 0899317 A1 | 3/1999 |
| WO | 9748655 A1 | 12/1997 |

\* cited by examiner

METHODS AND MATERIALS FOR ZONAL ISOLATION

CROSS-REFERENCE TO RELATED APPLICATIONS

This application claims the benefits of priority from:
i) Application Number 0513388.9, entitled "METHODS AND MATERIALS FOR ZONAL ISOLATION," filed in the United Kingdom on Jun. 30, 2005 and granted on Nov. 7, 2007 as Patent No. GB2427630; and
ii) Application Number PCT/GB2006/002351, entitled "METHODS AND MATERIALS FOR ZONAL ISOLATION," filed under the PCT on Jun. 26, 2006;

All of which are commonly assigned to assignee of the present invention and hereby incorporated by reference in their entirety.

This invention relates to processes and materials to improve zonal isolation by using reactive materials in the well drilling and/or completion process.

BACKGROUND OF THE INVENTION

Drilling operations typically involve mounting a drill bit on the lower end of a drill pipe or drill stem and rotating the drill bit against the bottom of the hole to penetrate the formation, creating a borehole. A drilling fluid, typically referred to as drilling mud may be circulated down through the drill pipe, out the drill bit, and back up to the surface through the annulus between the drill pipe and the annular wall. The drilling fluid has a number of purposes including cooling and lubricating the bit, carrying the cuttings from the hole to the surface, and exerting a hydrostatic pressure against the borehole wall to prevent the flow of fluids from the surrounding formation into the borehole.

A drilling fluid can place undesirable mechanical stress on the rock around the wellbore and may even damage the reservoir. With increasing depth a hydrostatic pressure acts outwards on the borehole, which may cause mechanical damage to the formation and reduce the ability of the well to produce oil or gas. Drilling fluids may also fracture the formation, requiring a drilling shutdown in order to seal the fracture.

It is therefore necessary to stabilize the formation and secure the wellbore from time to time.

After a section of the wellbore has been drilled, drilling operations are stayed or ceased to seal the wellbore using a string of pipe such as casing or a liner in the wellbore. The stops are normally referred to as casing points. At a casing point, a sealing composition such as hydraulic cement slurry is pumped into the annular space between the walls of the wellbore and the exterior of the string of pipe disposed therein. The cement slurry is permitted to set in the annular space thereby forming an annular sheath of hardened substantially impermeable cement therein. The cement sheath physically supports and positions the pipe in the wellbore and bonds the pipe to the wellbore whereby the undesirable migration of fluids between zones or formations penetrated by the wellbore is prevented.

This well-established technique has several disadvantages including a reduction in the well diameter after each casing point and the high cost of the casing itself.

The greatest weakness in conventional cement jobs is the poor bonding to the formation because of the presence of the drilling fluid filter cake on the wellbore wall. This can result in the flow or migration of formation fluids along weak pathways or microannuli in the annular gap between the casing and the formation.

U.S. Pat. No. 4,760,882 discloses a method for drilling and primary cementing using a mud containing a polymeric material that converts to cement on contact with an initiator and optionally radiation. U.S. Pat. Nos. 4,768,593 and 4,547,298 are similar but require radiation for curing. U.S. Pat. No. 4,760,882 gives useful background on mud-to-cement and also a good list of reactive low mol wt polymers including polybutadienes (PBD) and derivatives and a monomeric crosslinking agent containing at least one double bond as being required to cross-link the PBD and other polymers.

U.S. Pat. No. 5,293,938 describes a method of forming in a wellbore a dual-state composite of a hardened hydraulic cement and a solid rubber consisting of hydraulic cement and a vulcanizable rubber latex. The method pumps the mixture in place, allows the cement to set, then causes the latex to vulcanise.

U.S. Pat. No. 5,945,387 Halliburton relates to a settable plug that combines a water-soluble monomer in water with rubber latex as used before. The monomer is polymerised and the latex is vulcanised to a highly pliable and durable mass. No LMW liquid reactive water-insoluble polymers are used and no cement is used. U.S. Pat. Nos. 6,098,711; 6,234,251 and 6,330,917 describe related methods and compositions.

U.S. Pat. Nos. 4,115,336 and 4,204,998 cover a very stable (invert) emulsion of water in unsaturated polyester resin that is then mixed with cement. The resin is polymerised or crosslinked using an unsaturated monomer like styrene and initiated by for example peroxides.

U.S. Pat. No. 3,437,619 is an early description of a cement/polymer composite material formed by polymerising/crosslinking a polyester resin with an unsaturated monomer like styrene whilst simultaneously hydrating Portland cement dispersed in the polyester resin/monomer mixture. The cement is first mixed into the polyester and unsaturated monomer organic liquid phase. The initiator, a powdered water-soluble per-salt like sodium persulphate, is also dispersed into the organic phase.

Because of its insolubility in the organic liquid the initiator does not set off the polymerisation and cross-linking. The mixture remains a workable paste for a period. However when water is added, the initiator is activated by its dissolution and perhaps the high pH, causing the organics to start polymerising concurrently with the cement hydrating.

Thus there is a need for processes and materials that further improve the zonal isolation in a wellbore.

SUMMARY OF THE INVENTION

The invention relates to the use of one or more water-soluble reactive liquid components capable of subsequent polymerization or cross-linking to form a solid or layers of solid material to improve the zonal isolation and alleviate the impacts of cracks and fissures in the cement sheath around a completed subterranean well. The invention includes the steps of injecting a wellbore fluid carrying the reactive component or additive into the wellbore, injecting a cementitious composition as slurry into the wellbore and letting said reactive liquid component pass through at least one of the interfaces between cement and formation, cement and filter cake, and filter cake and formation before forming a solid of said reactive liquid component that traverses said at least one of the interfaces.

Preferably, cement slurry is allowed to at least partially set prior to the solidification of the reactive components.

The invention improves the well construction process by introducing one or more reactive liquids into a wellbore fluid. The wellbore fluid can either be a specifically adapted treatment fluid or alternatively, the reactive composition is an additive to the drilling fluid and/or the cement slurry or any spacer fluid injected into the well. The additive when polymerized or cross-linked gives preferably a solid elastomer or elastomeric layer percolating through at least two of the cement, the residual filter cake and the formation. Different reactive components can be used if added to the drilling fluid or cement, respectively.

The invention provides means for bridging interfaces present in the annulus of a completed wellbore. These interfaces are believed to contribute to observed zonal isolation problems, leaks and crossflow between zones. The reactive component either migrates through processes such as percolation, diffusion and the like in a true mass transport across the interface in question. Alternatively, there are reactive components present in both materials at the interface such that subsequent reactions establish links or bonds across it. The result of the process can be an at least locally continuous layer of solid material across the interface. As the process takes place at potentially many points along the interface the overall result is the creation of an impermeable or at least improved barrier against flow along the interface.

In a preferred embodiment the substantially water-insoluble reactive liquid component comprises one or more of a liquid monomer or solid monomer having a melting point of 60° C. or less, a reactive liquid oligomer, a reactive cross-linkable low molecular weight liquid polymer having a number average molecular weight of less than about 20,000, or any mixture of these of sufficiently low viscosity to flow adequately for mixing into the cement slurry.

The use of surfactants in any of the wellbore fluid, the drilling fluid and/or the cements slurry can further improve several processes after placement including the wetting, the migration and the distribution of the reactive component. The beneficial effect of the surfactants can be enhanced if they contribute to the polymerization or cross-linking by providing for example at least one double bond capable of entering into the polymerization or cross-linking reaction of the reactive liquid component.

The methods and compositions of the present invention can be further improved through the use of an activator, initiator, catalyst, vulcanizing agent or accelerator in the wellbore fluid to promote polymerization or cross-linking. The polymerization or cross-linking may be further enhanced through heating from either natural sources, i.e., the reservoir temperature or by placing an artificial heat source inside the casing to heat the annulus of the wellbore from within.

These and further aspects of the invention are described in detail in the following examples and accompanying drawings.

BRIEF DESCRIPTION OF THE DRAWINGS

The invention will now be described, by way of example only, with reference to the accompanying drawings, of which.

DETAILED DESCRIPTION

This invention concerns a process for improved sealing and isolation of subterranean zones penetrated by a wellbore.

Figure 1A:
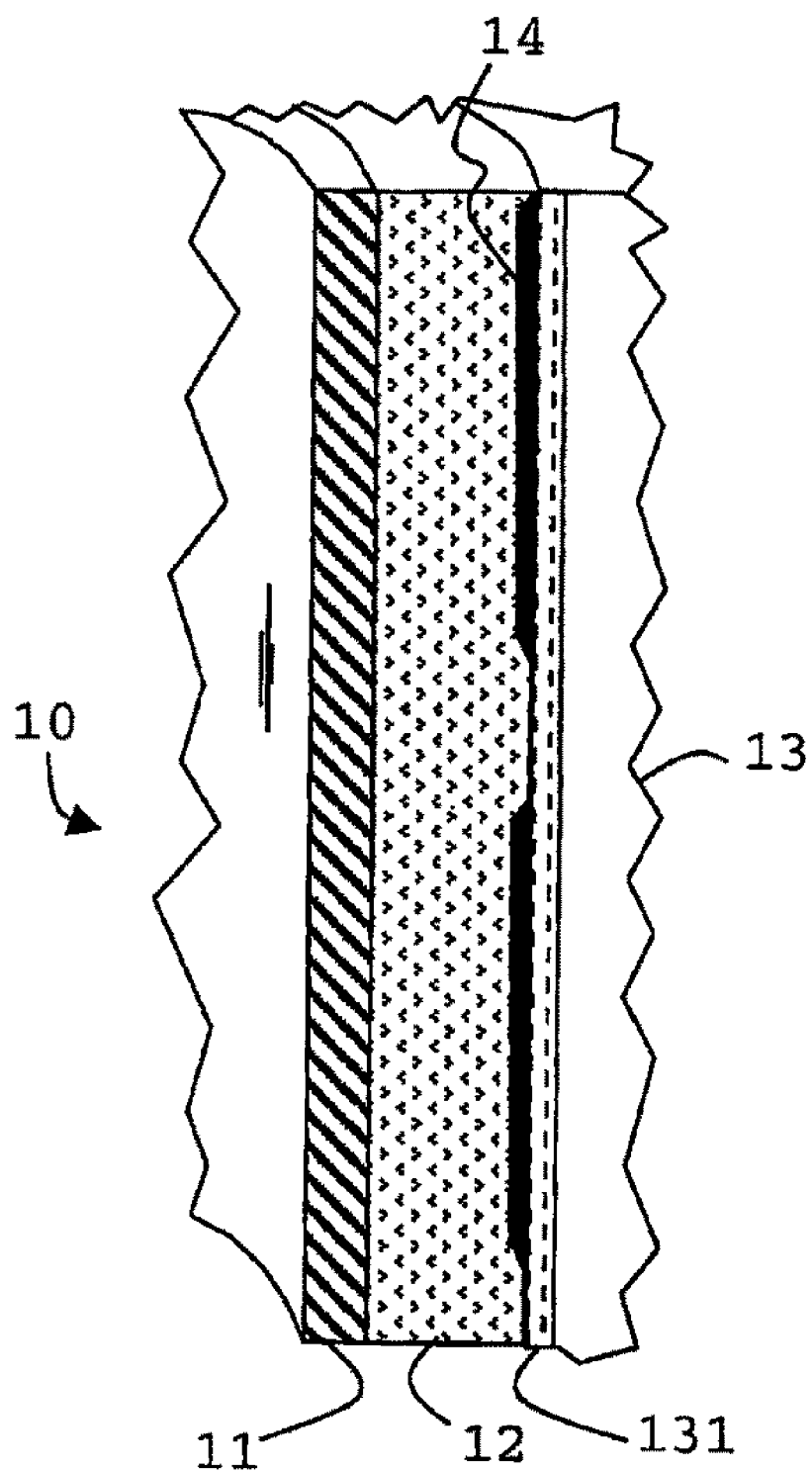
FIG. 1A-1C provide a schematic illustration of aspects of the present invention.

FIG. 1 shows a schematic of our invention for improved zonal isolation by building a flexible membrane at the wellbore wall and having continuous bonding between a novel cement, altered mudcake and the formation. In FIG. 1A there is shown a part of the casing 11 surrounding the well 10. The cement sheath 12 placed between casing 11 and the wall of the formation 13 is shown to include residual patches or layers 14 of filter cake, mostly solid parts of the drilling fluid. A superficial layer 131 of the formation 13 is shown as being invaded by fluid from the borehole 10 during drilling or completion.

Figure 1B:
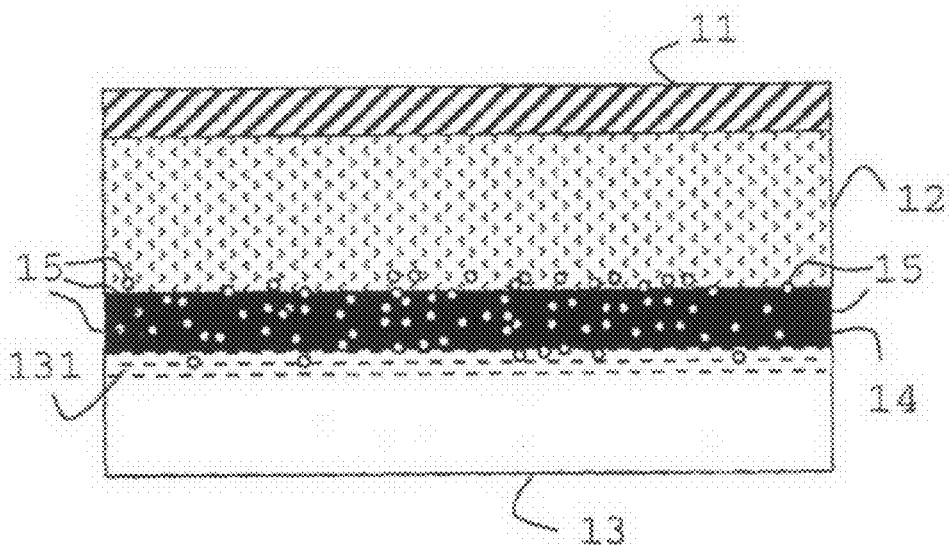

FIG. 1B shows in more detail the interfaces between the above materials in the annular space between casing 11 and formation 13 including the reactive components 15 added to the drilling fluid but at the stage illustrated in FIG. 1B forming a part of the filter cake layer 14 and having partially invaded the formation 13. As already stated, in an alternative variant the reactive fluid 15 may be initially an additive to the cement 12 or to both cement 12 and drilling fluid/filter cake 14.

Figure 1C:
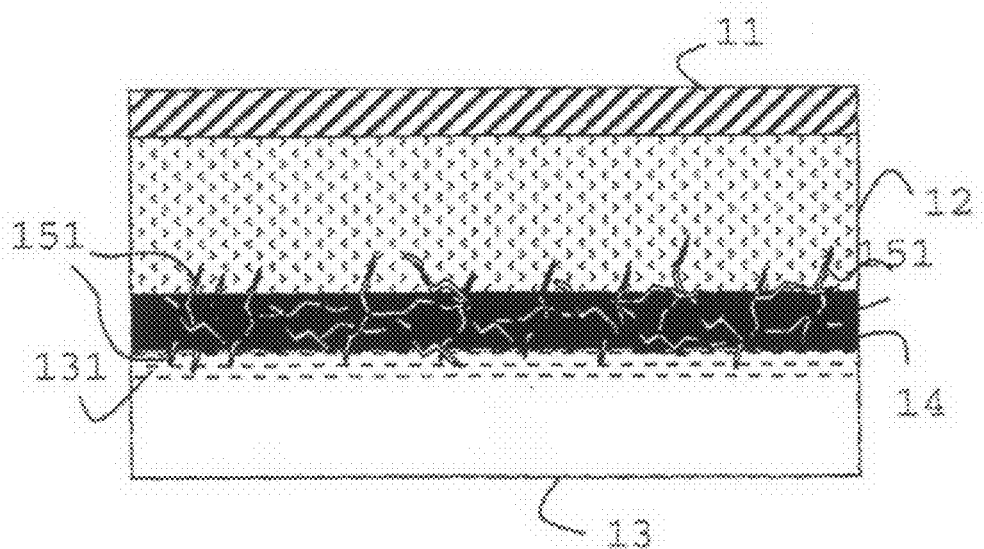

FIG. 1C shows in more detail the final stage of a process according to an example of the invention where the reactive components 15 form solid layers 151 in the voids and fissures of the materials 12,13,14 and across their interfaces.

Figure 2:
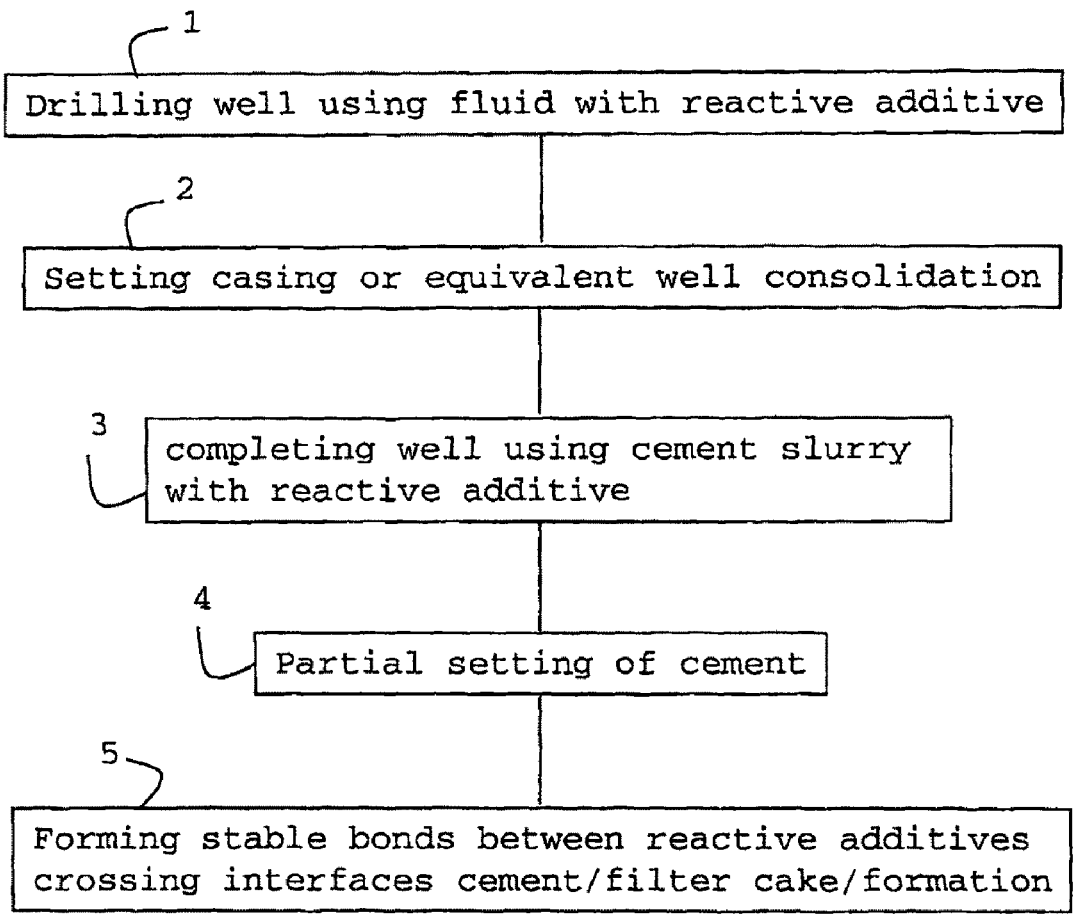
FIG. 2 is a diagram describing steps according to the present invention.

The process of this invention relates and is integrated into steps of the general process of drilling and completing a wellbore. These steps as far as be relevant to an example of the invention are illustrated in FIG. 2 and described below:

Step 1) Drilling a well through subterranean rock formations using a drilling fluid that comprises a substantially water-insoluble, reactive liquid (RL1) that is capable of subsequent polymerization or cross-linking to form a solid. Filtration of the drilling fluid into permeable rocks produces a filter cake at the wellbore wall that contains an increased concentration of RL1 that is at least partly coalesced. The RL1 also absorbs onto the surfaces and into the pores of rock formations;

Step 2) Lowering into the well a metal casing or liner of sufficient length to cover the interval of exposed rock;

Step 3) Displacing the drilling fluid and pumping into the annulus between the casing or liner and the filter cake on the wellbore wall a water-based hydraulic cement composition comprising also a dispersed reactive liquid (RL2) that is capable of subsequent polymerization or cross-linking to form a solid, wherein RL2 may be the same as RL1 or different but is capable of copolymerization or cross-linking together with RL1;

Step 4) Allowing the hydraulic cement composition to at least partially set; and Step 5) Causing the RL1 in the filter cake and absorbed in or on the rock formation, and the RL2 in the cement, to cross-link or polymerize forming many bonds or cross-links between RL1 and RL2 through the interface between the filter cake and the cement, thus creating a labyrinth of continuous polymer films through the cement and the filter-cake, bonded also to the formation.

The above steps and variations thereof are described in greater detail in the following sections of the specification.

In Step 1 the drilling fluid contains a dispersion of a reactive liquid RL1 that is in a liquid state at the temperature of the circulating drilling fluid. This may be higher than the ambient surface temperature. For instance, reactive materials with a melting point of about 60° C. are included During drilling using the drilling fluid containing RL1, some of the mud will filter at the surface of permeable rock formations. Both the mud solids and the dispersed RL1 will concentrate at the surface, forming a filter cake. The concentrated RL1 in the pores of the filter cake will tend to coalesce and form continuous films percolating through the cake.

RL1 may be any substantially water-insoluble liquid monomer, reactive oligomer, or reactive low molecular weight polymer, or any mixture of these. By low molecular weight is meant a number average molecular weight of less than about 20,000.

RL1 can comprise one or more liquid monomer(s) such as styrene, divinylbenzene, diallyl phthalate, liquid esters of acrylic acid or methacrylic acid and mono-, di-, or tri-functional alcohols, or a low melting point monomer such as dicyclopentadiene (melting point about 32° C.).

Oligomers or liquid low molecular weight polymers generally display improved health and safety characteristics compared to the monomers, and are therefore preferred as at least a major component of RL1.

In a preferred embodiment RL1 comprises a reactive oligomer or low molecular weight polymer of butadiene, more preferably characterized by at least half of the inter-monomer links being of the 1,2 addition type. This provides increased cross-linking reactivity through the pendant vinyl groups.

The rate and degree of cross-linking can be increased by mixing a monomer such as styrene with the liquid polymer. More preferably a di-functional agent such as divinylbenzene or diallyl phthalate is employed as a reactive cross-linking agent.

Other suitable reactive liquids include low molecular weight copolymers of butadiene and styrene; and a liquid copolymer of ethylene, propylene, and dicyclopentadiene (DCPD) containing residual reactive unsaturated groups provided by the DCPD grouping.

Preferably the drilling fluid contains RL1 at a concentration of between about 3% and about 50% by volume of the liquid phase In Step 1 the drilling fluid preferably also comprises one or more surfactants capable of adsorption onto rock formations thereby attracting a film of RL1 to the surface and into the pores of permeable formations. Surfactants may be added to the drilling fluid in a range of 0.2 to 6.0 percent of weight of the dispersed organic phase. Some examples of suitable surfactants are found for example in U.S. Pat. No. 4,828,724 relating to water based drilling fluids containing emulsified oil that is designed to adsorb onto rock surfaces using ethoxylated amines, ethoxylated diamines, and quaternary ammonium surfactants as oil wetting surfactants.

For convenience the term "oil-wetting" is used to include wetting by the water-insoluble liquid RL1.

The oil-wetting surfactant(s) can contain at least one hydrocarbon based hydrophobic grouping having from about 12 to about 22 carbon atoms and at least one adsorptive "anchor group" that is a primary amine, a secondary amine, a tertiary amine, or a quaternary ammonium group. These are especially useful for oil-wetting siliceous formations such as sandstone and shale. Examples include mono or di-alkylamines, mono- or di-alkanoyl amidoamines such as are obtained by the condensation of a fatty acid with a polyalkyleneamine, alkyl imidazolines, or salts of any of these. Mono- or di-(long alkyl) quaternary ammonium salts and lecithin are useful oil-wetting agents for shales and sandstone.

Anionic surfactants are more effective for oil-wetting calcium-rich formations such as limestone, chalk or anhydrite. Again the hydrophobe(s) can be at least one hydrocarbyl grouping having from about 12 to about 22 carbon atoms. The surfactant should contain at least one adsorptive anchor group that is an anionic grouping such as carboxylate, sulphonate, sulphate mono-ester, phosphonate, or a phosphate ester. The anionic surfactant may be present as an alkali metal salt or partially as an alkaline-earth metal salt. Care needs to be exercised in formulating water-based fluids using these surfactants. It is necessary to avoid the oil wetting of ground barium sulphate or calcium carbonate that may be dispersed in the drilling fluid as, for instance, weighting agents. Oil wetting can result in undesirable coalescence and separation of the particles. To avoid this one may, for instance, adjust the drilling fluid's density with soluble salts rather than barite or calcium carbonate.

Especially preferred are surfactants that are, or are based on, long chain fatty acid esters wherein the long chain fatty acid has from between about 12 to about 22 carbon atoms, and the surfactant or mixture of surfactants exhibits a Hydrophile Lipophile Balance (HLB) of at least about 7 as defined in the ICI publication "The HLB System". More preferably the HLB lies in the range of about 8 to about 18.

The fatty acid esters can be polyethylene glycol (PEG) esters and esters of copolymers of ethylene oxide and propylene oxide. Also included are long chain fatty acid esters of sorbitan, glycerol, polyglycerols, pentaerythritol, sugars, trimethylolpropane, and derivatives of these such as ethoxylated derivatives that exhibit a higher. HLB compared to that of the base ester. It will be appreciated that there are or can be hydrolysable long chain fatty acid esters of many other polyols and derivatives of such esters that exhibit the desired HLB. These are included as within the scope of this invention.

Examples of suitable surfactants include the monoester formed from oleic acid and a polyethylene glycol, the PEG having a molecular weight of 530 (12 moles of ethylene oxide). This surfactant exhibits an HLB of about 13.4. Another example is sorbitan monooleate POE 20, otherwise known as Polysorbate 80 and a commercial name TWEEN 80. The POE 20 refers to a grafted polyoxyethylene chain comprised of 20 moles of ethylene oxide. TWEEN 80 exhibits an HLB of about 15. Both surfactants are gradually hydrolysed by lime in water, the rate being dependant on the temperature. Therefore when lime-rich cement is pumped into contact with the filter cake, the alkaline cement filtrate will cause the gradual hydrolysis of the surfactant in the filter cake to produce the calcium soap of the fatty acid. The rate of hydrolysis is much slower in the drilling fluid at the much lower pH employed (e.g. pH 9.5 c.f. about pH 13 for lime), and is generally acceptable for the temperatures and time involved. If yet slower hydrolysis is required, hindered esters formed from branched chain fatty acids or alcohols can be employed.

The effective HLB of a surfactant mixture can be calculated as explained in the ICI "The HLB System" guide. For example, a mixture of 70% TWEEN 80 (HLB=15) with 30% SPAN 20 (sorbitan monolaurate, HLB=4.3) results in an HLB for the blend of 11.8. Thus it can be seen that individual component surfactants may have an HLB of less than 7 as long as they are counterbalanced by one or more higher HLB surfactant such that the effective HLB of the blend is above 7.

Polyols and PEG hydrophilic groups are known to adsorb not only onto silica, shale and clay faces, but also onto calcium carbonate. Therefore, by judicious choice of the fatty acid and (for instance) the molecular weight of a PEG forming an ester with the fatty acid, the surfactant(s) will cope with almost all of the rock formations likely to be encountered. More advantageously, at a later stage in the process, mud residues in the well such as the filter cake will be juxtaposed to an alkaline liquid cement slurry at about pH 13. The high pH will hydrolyse the ester groups releasing the long chain fatty acid as the calcium soap. This will strongly oil-wet (with RL1) the solids in the filter cake and the rock at the surface of the wellbore wall.

In the last step of this process as described below RL1 and a further additive in the cement (RL2) are caused to polymerize or cross-link to produce continuous percolating films of solid polymer that are adsorbed onto the various inorganic solid surfaces. The integrity and physical properties of the set materials would therefore be improved if the adsorbed surfactants were to react and link with RL1 during this step, thereby coupling the polymer to the mineral surfaces.

It is therefore especially preferred that the hydrophobic groupings of the surfactant(s) contain at least one double bond capable of entering into the polymerization or cross-linking reaction with the reactive liquid(s). Even more preferred is that a double bond resides in the $\alpha,\beta$ (terminal) position. In the case of multiple double bonds it is preferred that these be conjugated.

According to this embodiment the adsorbed surfactant or hydrolysis product that attracts the layer of reactive liquid to the surface of the formation and the surfaces of the solids in the filter cake will now form covalent links to the solid polymer. This improves the bonding to the formation and the physical properties of the altered filter-cake containing the polymer network.

In the usual Step 2 of process of drilling a well, after a certain interval has been drilled, it is decided for various reasons to stabilize that interval by casing it with steel tubing. The steel casing or liner is lowered into the well. The drilling fluid remaining in the well is then displaced by a cement slurry using any of a variety of conventional techniques to achieve efficient displacement and minimal mixing of the cement with the drilling fluid. The cement is pumped to fill the annular gap between the outside of the casing and the wellbore wall on which the mud filter cake resides.

The novel cement slurry used in the process of this invention is now described.

The Step 3 includes the use of an inorganic cementitious material in the slurry. This material can be a hydraulic cement suitable for wellbore use. Preferred cements are the Portland cement grades that are given the API classifications A through H. The cement powder is mixed with a sufficient quantity of water to form a flowable slurry.

A substantially water-insoluble reactive liquid (RL2) is mixed into the cement slurry typically (but without limitation) at a dose of between about 5% to about 50% by weight of cement. RL2 may be identical or different to RL1, but must be capable of copolymerization or cross-linking with RL1.

In the same manner as described above for RL1, RL2 may be any substantially water-insoluble liquid monomer, reactive oligomer, or reactive low molecular weight polymer, or any mixture of these.

RL2 is chosen from an identical set of materials as described above for RL1.

Preferably there is also added to the cement slurry a surfactant or mixture of surfactants typically dosed at between 0.1% and 3% by weight of cement. The surfactant(s) is (are) chosen to act in two specific ways.

Firstly the surfactant serves to substantially prevent RL2 from wetting the surfaces of the inorganic cement particles as they are hydrating, thereby promoting the efficient hydration and set of the cement in the conventional manner.

Secondly however the surfactant can be chosen to gradually hydrolyse by interaction with the lime released during the cement hydration process. This process then produces a calcium salt of an organic acid that then adsorbs onto and "oil-wets" the pore walls of the cement after the cement has at least partially set over a period of at least several hours. This attracts a layer of RL2 onto the interstitial surfaces of the cement creating continuous films percolating through the now-set cement. The RL2 is present in sufficient concentration to form a meniscus bridging many of the pore throats in the cement.

Therefore, after RL2 liquid is ultimately polymerized or cross-linked as described in the steps to follow below, a solid elastomeric film percolates the cement, the film being strongly adsorbed onto the cement. This provides greatly improved physical properties and resilience to the cement. The polymer plugs formed in the pore throats greatly reduce the permeability of the cement, and the hydrophobic nature of the film increases the resistance of the cement to attack by water, acid gases and chemicals.

Preferred surfactants (i.e. those that exhibit the temporary dispersing effect on RL2 and then hydrolyse to give a species that attracts a film of RL2 onto the interstitial cement surfaces) are surfactants that are based upon long-chain fatty acid esters. By long-chain is meant having from about 12 to about 22 carbon atoms. The surfactant or blend of surfactants exhibits a Hydrophile Lipophile Balance (HLB) of at least about 7 as defined in an ICI publication "The HLB System". More preferably the HLB lies in the range of about 8 to about 18.

The fatty acid esters can be selected from the class including polyethylene glycol (PEG) esters and esters of copolymers of ethylene oxide and propylene oxide. Also included are long-chain fatty acid esters of sorbitan, glycerol, polyglycerols, pentaerythritol, sugars, trimethylolpropane, and derivatives of these such as those grafted with polyoxyethylene chains. Adding a POE chain confers a higher HLB compared to that of the base ester. It will be appreciated that there are or can be hydrolysable long-chain fatty acid esters of many other polyols, and derivatives of such esters, that will exhibit the desired HLB, and these are also included.

Examples of suitable surfactants include sorbitan monooleate POE 20 and PEG (12 moles of EO) monooleate as described previously.

Especially preferred are ester surfactants wherein the fatty acid moiety or moieties contain at least one double bond capable of entering into the polymerization or cross-linking reaction with the reactive liquid RL2.

Even more preferred is that a double bond resides in the high reactivity $\alpha,\beta$ (terminal) position as exemplified in U.S. Pat. No. 6,433,075.

In the case of multiple double bonds it is preferred that these be conjugated.

According to this embodiment the fatty acid salt strongly adsorbed on the surfaces of the cement matrix will attract a layer of RL2 to the surface and then form covalent bonds to the polymer during the step of polymerizing or cross-linking RL2.

This bonding of the polymer to the cement matrix results in a further improvement in the physical properties and resilience of the cement/polymer composite.

In Step 4 it is desired that the inorganic cement at least partially set before the reactive water-insoluble organic liquids cross-link or polymerize (hereafter "cure") to any great degree. The inorganic cement set-time may be varied by adding conventional accelerators or retarders, but generally a substantial set is achieved between about 4 hours to about 12 hours.

The Step 5 includes the step of causing the reactive liquids to polymerize or cross-link.

The vinylic reactive liquids may be cured by the addition of a free-radical initiator such as organic or inorganic peroxides or inorganic persulphates, or 2,2'-azo(bis-amidinopropane) dihydrochloride, or sulphur based cross-liking including accelerators as taught in U.S. Pat. No. 6,303,683, radiation, or any other suitable method of the many known in the field of polymer (especially elastomer) technology.

In one embodiment the initiator is present in the drilling fluid from the beginning in order for it to be thoroughly dispersed in the mud filter cake, and the cure is caused when desired by, for instance, heating the cased and cemented wellbore interval.

In another embodiment the initiator is only present in the cement slurry. As the cement makes quite intimate contact with the filter cake, sufficient initiator transfers to the cake to trigger the cure of RL1. In particular, water-soluble initiators such as alkali-metal or ammonium persulphate will be carried by the cement filtrate into the mud cake. The absence of initiator in the drilling fluid avoids premature curing of RL1.

The rate of curing of the organic phase(s) in the filter cake and the cement can be varied by a variety of methods including:
- Increased by increasing the concentration of reactive monomer(s) and/or difunctional cross-linkers in admixture with liquid oligomers or polymers;
- Increased by increasing the dose of initiators;
- Increased by adding a catalyst. For example a cobalt or other transition metal salt soluble in the reactive liquid such as cobalt naphthenate will catalyze free-radical cures;
- Increased by using a redox catalyst pair of oxidizer and reducing agent;
- Increased by accelerators in a sulphur-cure system; and
- Increased by a temperature rise Conversely, the cure time can be lengthened by reversing the above actions. Therefore, given knowledge of the underground temperature for the interval concerned, and the degree of cooling by the drilling and cementing process, one can engineer that the cure to produce the polymer occurs substantially later than the inorganic cement set time. There is leeway for the organic cure time to be quite lengthy as the conventional cement component of the composite will set sufficiently to allow drilling to recommence. As the well is deepened the drilling fluid becomes progressively hotter which will help to complete the cure of the polymer.

For a more complete or rapid cure, or for low temperature wells, a source of heat can be placed inside the casing to substantially raise the temperature above the background. For example a powdered anhydrous salt having a highly exothermic reaction with water can be slurried in oil. A high concentration of water emulsified into oil as an "invert" emulsion is then caused to mix with the salt slurry immediately before pumping the mixture to the desired location inside the casing. The salt is hydrated creating a large temperature rise sufficient to cause the cure of the reactive liquids. An example of a suitable salt is anhydrous magnesium chloride.

It should be noted that the above described example of using a reactive liquid in both the drilling fluid and the cement is the most complete application of a method in accordance with the present invention. The zonal isolation may already be improved by the presence of one of such system, which could be either the drilling fluid and the cement. The reactive liquid, if for example, concentrated in the filter cake has the tendency to diffuse and percolate across the interfaces into the formation or into the cement. Hence an improvement of the isolating properties may already be observed with using a single reactive liquid in a single system Based on the experimental results the following examples of a drilling fluid and a cement are expected to give the best results.

EXAMPLES

Drilling Fluid Formulation Per Barrel (Metric Units)

0.59 barrel (94 l) Water
3.0 lbs (1.36 kg) Emulsifier (monooleate ester of polyethylene glycol MW 600)
0.32 barrel (51 l) Reactive liquid (1,2 polybutadiene oligomer (B1000 of Nippon Soda Co., MW 1160)
0.6 lbs (0.273 kg) Xanthan gum
2.0 lbs (0.91 kg) Fluid loss control agent (Drispac® Superlo a polyanionic cellulose by Drilling Specialities Inc)
100 lbs (45.5 kg) Barite
pH adjusted to pH 9 with NaOH.

Cement Formulation Per Barrel [Alternatively Per 600 ml]

| 4.6 sk | [802 g] Cement Dyckerhoff Class G |
|---|---|
| 4.3 gal/sk | [269 g] Water |
| 0.9 gal/sk | [54 g] PBD |
| 0.4% BWOC | [3 g] TWEEN80 |
| 0.4% BWOC | [3 g] potassium persulfate |
| 0.06 gal/sk | [5 g] Dispersant |

The invention claimed is:

1. A method of constructing a well in a subterranean formation comprising the steps of
   preparing a wellbore fluid comprising a substantially water-insoluble reactive liquid component capable of subsequent polymerization or cross-linking to form a solid;
   injecting the wellbore fluid into the wellbore;
   injecting cement slurry into the wellbore;
   letting said reactive liquid component establish chemical bonds across at least one of the interfaces between cement and formation, cement and filter cake, and filter cake and formation; and
   forming a solid of said reactive liquid component that traverses said at least one of the interfaces.

2. The method of claim 1, wherein the cement slurry is allowed to at least partially set prior to the forming of the solid.

3. The method of claim 1 wherein the wellbore fluid is a drilling fluid.

4. The method of claim 3 wherein the drilling fluid further comprises between about 1 gram/liter and 30 gram/liter of one or more surfactant(s) to promote the wetting of the formations drilled by the reactive liquid component and/or the absorption of the reactive liquid component into porous rock formations.

5. The method of claim 4 wherein the one or more surfactant(s) have hydrophobic groups which contain at least one double bond capable of entering into the polymerization or cross-linking reaction of the reactive liquid component.

6. The method of claim 4 wherein the drilling fluid further comprises one or more surfactant(s) selected from the group consisting of esters of long chain fatty acids wherein the fatty acid has from between about 12 and about 22 carbon atoms and wherein the surfactant or the surfactant blend exhibits an HLB of at least about 7 to about 18, and wherein the ester group is capable of hydrolysis in the presence of lime or Portland cement to produce a fatty acid calcium salt.

7. The method of claim 3 wherein a reducing agent is mixed into the drilling fluid so that it is also present in a filter cake formed from the drilling fluid, and wherein an oxidizing agent is in the cement slurry so that when it is pumped in place and contacts the filter cake the reducing agent and the oxidizing agent together form a redox catalyst for the cross-linking or polymerization of the reactive liquid component.

8. The method of claim 1 using a first substantially water-insoluble reactive liquid component as additive to the wellbore fluid and a second substantially water-insoluble reactive liquid component as additive to the cement slurry, wherein said first and second reactive liquid components are capable of polymerization or cross-linking with each other.

9. The method of claim 1 wherein the cement slurry comprises Portland cement.

10. The method of claim 1 wherein the solid formed by the polymerization of the reactive liquid component is an elastomer.

11. The method of claim 1 wherein the substantially water-insoluble reactive liquid component is selected from the group consisting of one or more of a liquid monomer or solid monomer having a melting point of 60° C. or less, a reactive liquid oligomer, a reactive cross-linkable low molecular weight liquid polymer having a number average molecular weight of less than about 20,000, and any mixture of these of sufficiently low viscosity to flow adequately for mixing into the cement slurry.

12. The method of claim 1 wherein the substantially water-insoluble reactive liquid component is selected from the group consisting of liquid oligomers and reactive polymers of butadiene; reactive liquid copolymers of butadiene and styrene; reactive liquid copolymers of ethylene, propylene and dicyclopentadiene; styrene; divinyl benzene; diallyl phthalate; liquid esters of acrylic acid or methacrylic acid and mono-, di-, or tri-functional alcohols; a low melting point monomer; and any mixture of these.

13. The method of claim 12 wherein the butadiene oligomers and polymers are characterised by at least one half of the inter-monomer linking being of the 1,2-addition type resulting in a plurality of reactive pendant vinyl groupings.

14. The method of claim 1 using an activator, initiator, catalyst, vulcanizing agent or accelerator in the wellbore fluid.

15. The method of claim 14 wherein the activator, initiator, catalyst, vulcanizing agent or accelerator is a water-soluble persulphate salt.

16. The method of claim 1 using an activator, initiator, catalyst, vulcanizing agent or accelerator in the cement slurry.

17. The method of claim 16 wherein the activator, initiator, catalyst, vulcanizing agent or accelerator is water-soluble and transferred to the filter cake by the cement filtrate.

18. The method of claim 1 using a heat source being placed inside a casing to promote the cross-linking or polymerization of the reactive liquid component.

19. A method of constructing a well in a subterranean formation comprising the steps of
preparing a cement slurry comprising a substantially water-insoluble reactive liquid component which is selected from the group consisting of one or more of a liquid monomer or solid monomer having a melting point of 60° C. or less, a reactive liquid oligomer, a reactive cross-linkable low molecular weight liquid polymer having a number average molecular weight of less than about 20,000, and any mixture of these of sufficiently low viscosity to flow adequately for mixing into the cement slurry and which is capable of subsequent polymerization or cross-linking to form a solid;
injecting the cement slurry into the wellbore;
letting said reactive liquid component establish chemical bonds across at least one of the interfaces between cement and formation, cement and filter cake, and filter cake and formation; and
forming a solid of said reactive liquid component that traverses said at least one of the interfaces.

20. The method of claim 19 wherein the cement slurry comprises Portland cement.

* * * * *